D. C. Stover.
Cultivator.

Nº 87,724.  Patented Mar. 9, 1869.

Witnesses:
Alex F. Roberts
C. L. Topliff

Inventor:
D. C. Stover
per Munn
Attorneys

United States Patent Office.

D. C. STOVER, OF LANARK, ILLINOIS.

Letters Patent No. 87,724, dated March 9, 1869.

IMPROVEMENT IN CULTIVATORS.

The Schedule referred to in these Letters Patent and making part of the same.

*To all whom it may concern:*

Be it known that I, D. C. STOVER, of Lanark, in the county of Carroll, and State of Illinois, have invented a new and useful Improvement in Corn-Cultivators; and I do hereby declare that the following is a full, clear, and exact description thereof, which will enable others skilled in the art to make and use the same, reference being had to the accompanying drawings, forming part of this specification.

This invention relates to improvements in the construction of cultivators, the object of which is to make them more useful than as at present arranged.

It consists in the combination of the pivoted adjustable yoke with the bent rods, the brackets, and the frame of the carriage, whereby the plow-beams are connected to the carriage, as will be hereinafter more fully described.

Figure 1:
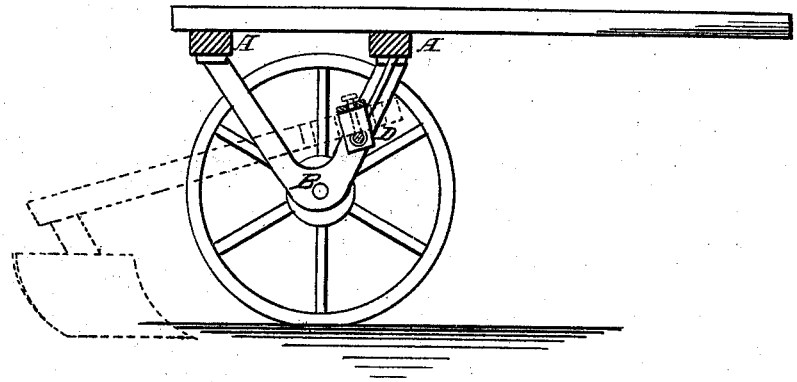
Figure 2:
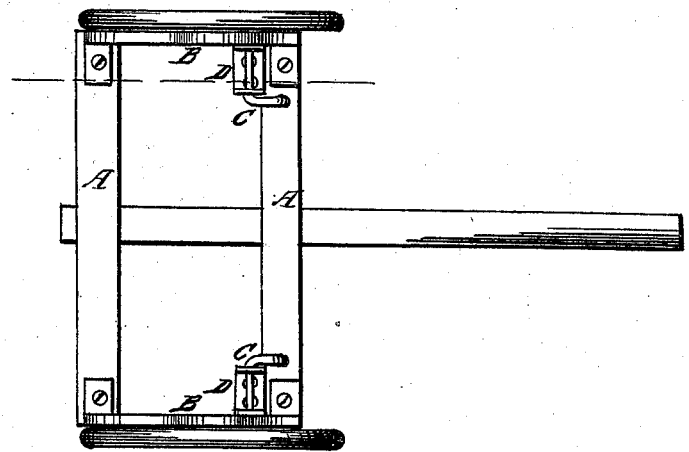

Figure 1 represents a sectional elevation of a cultivator, constructed according to my improvements, taken on the line *x x* of fig. 2; and Figure 2 represents a plan view of the bottom of the same.

Similar letters of reference indicate like parts.

The cross-beams A of the frame are supported upon the inverted V-shaped brackets B, in the apex of which the axles of the wheels are supported.

C represents rods, bent at about their centres into right-angular form, and secured by one end to the brackets, and by the other to the lower face of the front beam A, forming the means for supporting the plow-beams.

D represents metallic yokes, pivoted to the horizontal parts of the rods C, and to which the plow-beams are adjustably connected, as represented in red in fig. 1, by bolts, or otherwise, so that the plow may be brought nearer to or further from the said yokes, to change the pitch of the plows, and admitting of the vertical oscillation of the plows, caused by the irregularity of the ground.

The said yokes, being turned above this support, will have the effect, when it may happen that the wheels are turned backward, to raise the plows out of the ground to some extent, and thereby admit the said backward movement, without damage to any part of the same.

This arrangement I consider an important feature, as it is often necessary to back up the plows to disengage them from roots, and for other causes, which has been attended with danger to the machines, as heretofore constructed, on account of the tendency of the plows to be forced deeper into the ground.

Having thus described my invention,

I claim as new, and desire to secure by Letters Patent—

The combination of the pivoted adjustable yoke D with the bent rod C, bracket B, and carriage A, arranged and operating as described, for the purpose specified.

The above specification of my invention signed by me, this 14th day of September, 1868.

D. C. STOVER.

Witnesses:
 JOHN J. WOOD,
 EDDY ALDRICH.